Figure 1:
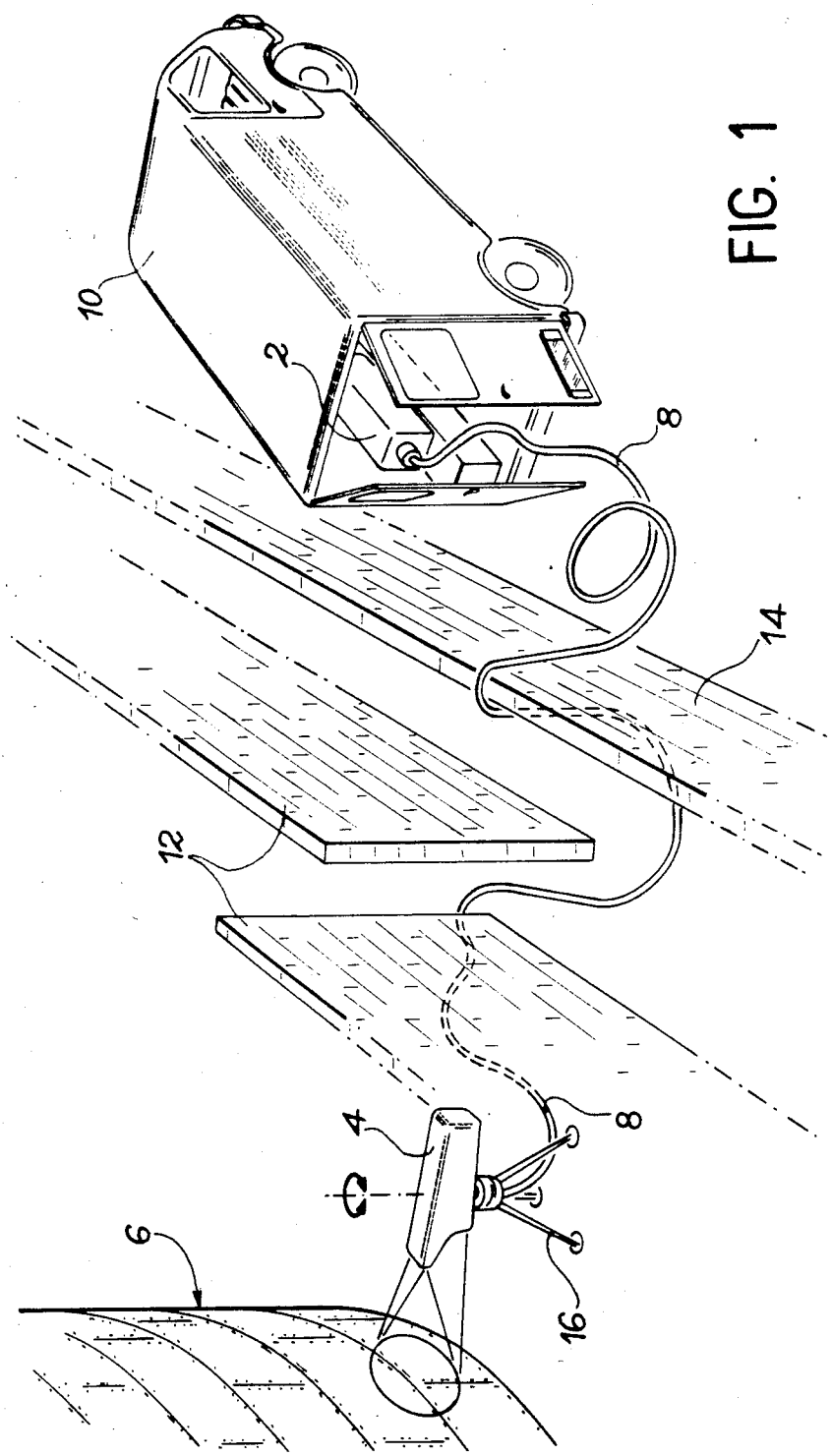

United States Patent [19]

Bouteyre et al.

[11] Patent Number: 4,798,466
[45] Date of Patent: Jan. 17, 1989

[54] DEVICE FOR THE NON-DESTRUCTIVE INSPECTION OF A PART BY MEANS OF OPTICAL HOLOGRAPHY

[75] Inventors: Jacques Bouteyre, Saint Medard en Jalles; Christian Le Floc'H, Blanquefort, both of France

[73] Assignee: Aerospatiale Societe Nationale Industrielle, Paris, France

[21] Appl. No.: 5,694

[22] Filed: Jan. 20, 1987

[30] Foreign Application Priority Data

Jan. 20, 1986 [FR] France ................................ 86 00701

[51] Int. Cl.$^4$ .......................................... G01B 9/025
[52] U.S. Cl. .................................... 356/347; 350/96.24
[58] Field of Search .............................. 356/347, 348; 350/96.24, 3.8

[56] References Cited

U.S. PATENT DOCUMENTS 4,643,514  2/1987  Raviv et al. ..................... 356/347 X

FOREIGN PATENT DOCUMENTS 2620755  11/1977  Fed. Rep. of Germany .
2543299  9/1984  France .
1505894  3/1978  United Kingdom ................. 350/3.8

OTHER PUBLICATIONS

Optical Engineering, vol. 25, No. 5, Sep./Oct. 1985, pp. 746-753, Society of Photo-Optical Instrumentation Engineers, Bellingham, Washington, U.S., B. A. Tozer et al.

Primary Examiner—Davis L. Willis
Assistant Examiner—Matthew W. Koren
Attorney, Agent, or Firm—Pearne, Gordon, McCoy & Granger

[57] ABSTRACT

This invention concerns a device for the non-destructive inspection of a part (6) by means of optical holography. This device includes a source (2) emitting a laser beam and a holographic camera (4) placed at a certain distance from the source (2) and close to the part to be inspected (6); the laser beam is transmitted from the source (2) to the camera (4) by means of a beam of sequenced optical fibers (8) suitable for transmitting a high-powered laser beam, while maintaining the coherence of space and time of this laser beam. The device is suitable for interferometry nondestructive inspection applications.

1 Claim, 5 Drawing Sheets

DEVICE FOR THE NON-DESTRUCTIVE INSPECTION OF A PART BY MEANS OF OPTICAL HOLOGRAPHY

The present invention concerns a device for the non-destructive inspection of a part by means of optical holography, such device being more flexible in use than currently known similar devices. Holography is a three-dimensional method of photography using the interferences produced by two coherent light beams. These two beams are obtained by separating a laser emission. The separation point determines the parting of the two beams towards a film pack. The first beam, directed towards the object and backscattered by the latter towards the film pack, is known as an "object ray" and the second beam is known as a "reference beam". The distances travelled by the two beams from the point of separation as far as the film pack have the same length and the object to be observed must be situated inside the coherence length of the laser. These two beams interfere onto a film pack, thus encoding in amplitude the operation difference induced by the relief of the object. The film pack is then developed and it is observed by illuminating it using a laser beam under the same incidence. Owing to the interferences which have exposed the film, the observer can see in relief the object which has been photographed.

If holography is used for the non-destructive inspection of a mechanical part, a first hologram of the object is superimposed under a certain state of stress and a second hologram of the object is superimposed under another state of stress. In general, the first state corresponds to an absence of stress, whilst in the second state the part undergoes tensile stresses or stresses due, for example, to the pressure of a gas.

If anomalies exist, these are revealed by irregularities in the interferogram set of fringes read by the inspector. The "interferogram" is the image obtained by superimposing holograms of the part under two different states of stress. It is thus possible to detect defects, such as faults, cracks and separations on solid or hollow parts.

For hollow parts, it is often necessary to look for defects inside cavities. Now, in the holographic inspection benches usually used, the laser and holographic camera are intergal and indissociable, which renders such devices heavy and cumbersome. It is thus only possible to use them to examine cavities with large dimensions. Moreover, as regards a given position, only a relatively limited surface area can be covered. In order to enlarge the field of investigation, it is necessary to move the part to be examined and/or the inspection device, this being very difficult because of the weight and bulkiness of such elements, or to use several inspection devices, which increases the cost of the installation.

In the French patent application No. 84 11450 registered on the 19th July 1984 in the name of the applicant, a solution is offered to these problems by putting forward a non-destructive inspection device using optical holography in which the camera is separated from the laser source, the beam being transmitted from the source to the camera by means of a set of mirrors or prisms. This arrangement enables the camera to be introduced into small cavities, an arrangement which was not possible using currently known devices. Furthermore, the unit offers a certain flexibility which enables many observations to be made, even as regards parts with complex shapes, as only the camera moves.

However, if it is desired to improve flexibility in use as compared with conventional devices, this current device still has a number of drawbacks. For example, it is essential to precisely adjust the position of the mirrors and/or prisms so as to properly position the beam at the camera entrance. If it is necessary to modify the relative position of the source and camera, it is also necessary to re-adjust the position of the various mirrors, which can result in significant losses of time.

In addition, one is familiar with devices in which optical fibers are used on the reference beam or on the object ray or possibly on both. In certain cases, fibers are used known as "monomodes" which are well adapted for preserving the laser beam's coherence of time and space, but these do not allow for energy transmission. To a certain extent, fibers known as "multimode" fibers do allow for power transmission, but they downgrade wave fronts which enables interferences to be generated for producing holograms. If such fibers are suitable when dealing with average quality holograms, they can no longer be used for producing readable interferograms, as the mode jumps provoked by slight movements of the fiber result in energy differences between the two takes which alters the contrast of the interference fringes.

The aim of the present invention is to overcome the drawbacks mentioned above by offering a device for the non-destructive inspection of a part by means of optical holography which enables the relative position of the laser source and camera to be modified without having to carry out any adjustment of the mirrors and/or prisms, whilst allowing high-quality interferograms to occur.

The device according to the invention already includes known means:
  a source emitting a laser beam;
  a holographic camera placed away from the said source, this camera including at least:
    one input for the laser beam;
    means to create a reference beam and an object ray and
    means to create a hologram from the reference beam and object ray;
  and means to bring the laser beam of the source as far as the said input.

According to the invention, the carrier means of the laser beam include a bundle of sequenced optical fibers adapted to transport high-powered energy (about 10 joules or wattseconds) and to retain the laser beam coherence of time and space.

The expression "sequenced optical fibers" used in the present description means that the relative distance of a fiber in relation to nearby fibers remains the same all along the beam.

Thus, the relative position of the laser source and camera can be modified without having to carry out long and delicate operations, such as adjustment of the mirrors, since the beam is transmitted through a flexible cord, one of whose extremities is secured to the source and the other being secured to the camera.

Advantageously, the device may be equipped with a focussing lens placed at the input of the bundle of optical fibers and/or with a focussing lens placed at the output of the beam.

In the invention, the number of fibers in the beam is greater than or equal to 100 and may even be higher, for example in the order of 100,000. As for the diameter of the fibers, this is between 2 and 15 μm and usually about 10 μm.

The insertion of high amounts of energy, contrary to the case with other processes which require focussing of the beam onto the fiber input, does not pose any problems. Indeed, processes with high energy focussing result in an ionization of the air (plasma) provoking breakdown of the latter which destroys the fiber. As for the lens possibly placed at the fiber beam output, this renders the laser beam parallel so as to compensate for the dispersion induced by the numerical aperture of the bundle of fibers.

Preferably, fibers are used, each of which consists of a glass core surrounded by a cladding and glass having a refraction coefficient lower than that of the glass making up the core.

Figure 2:
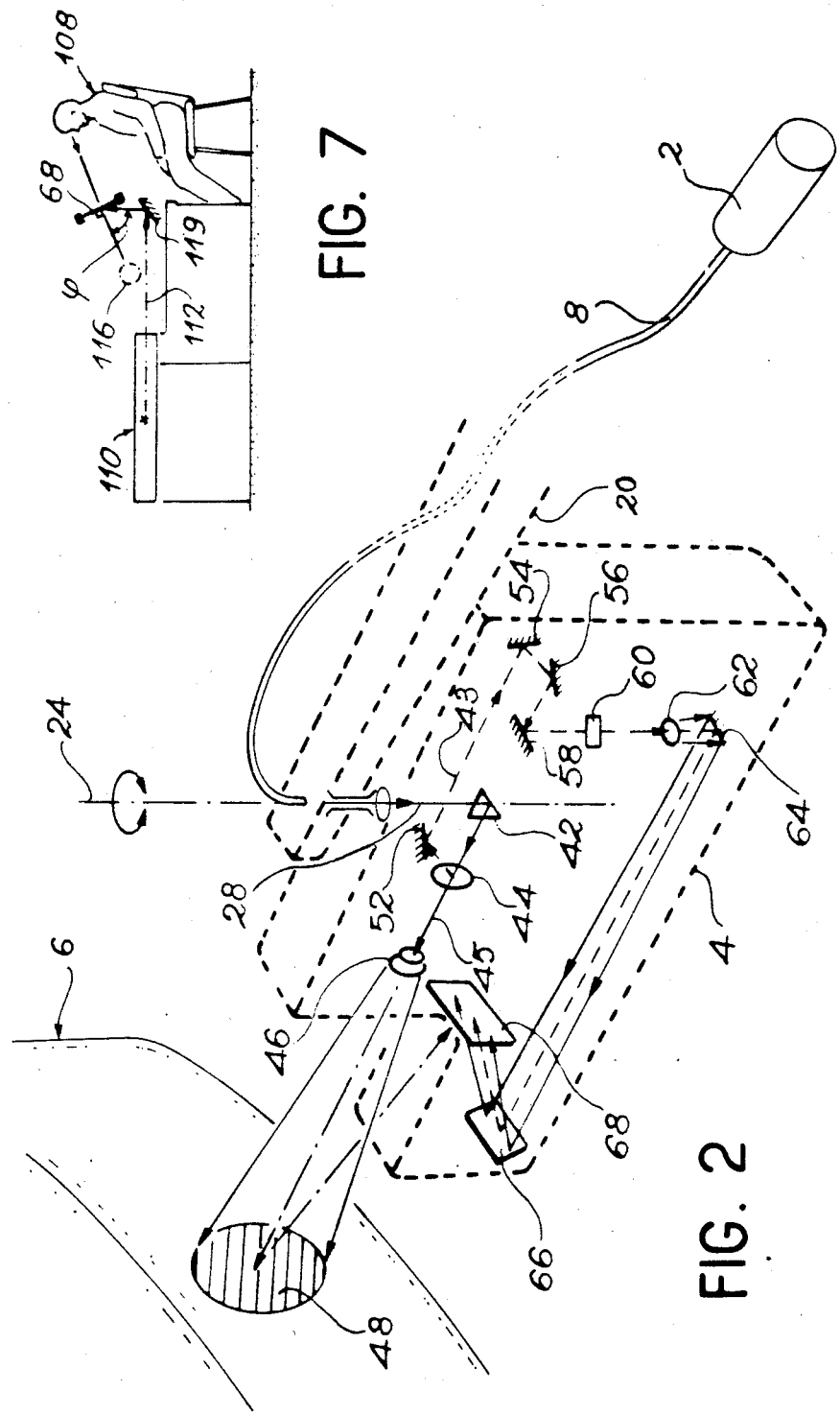
Figure 3:
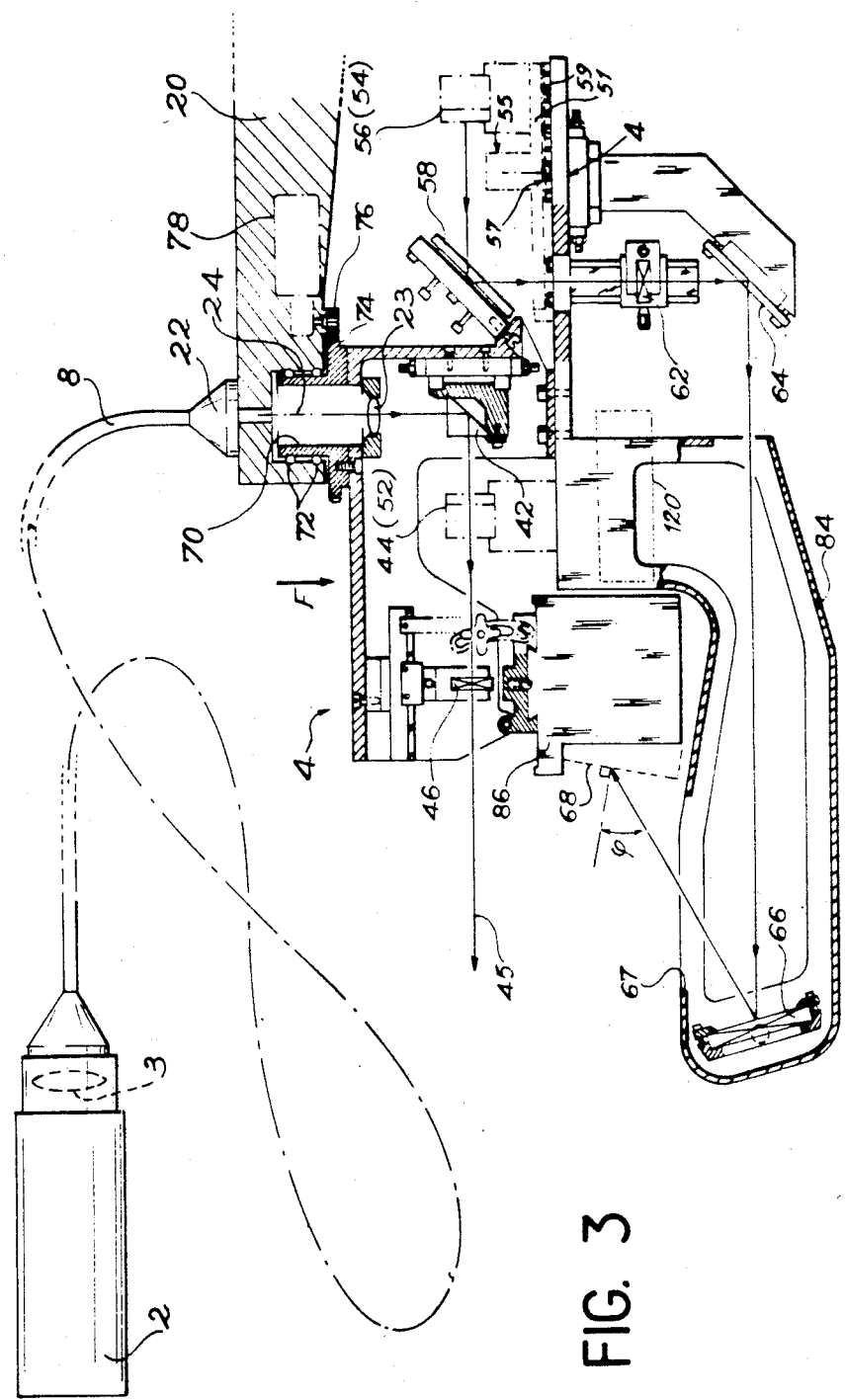
Figure 4:
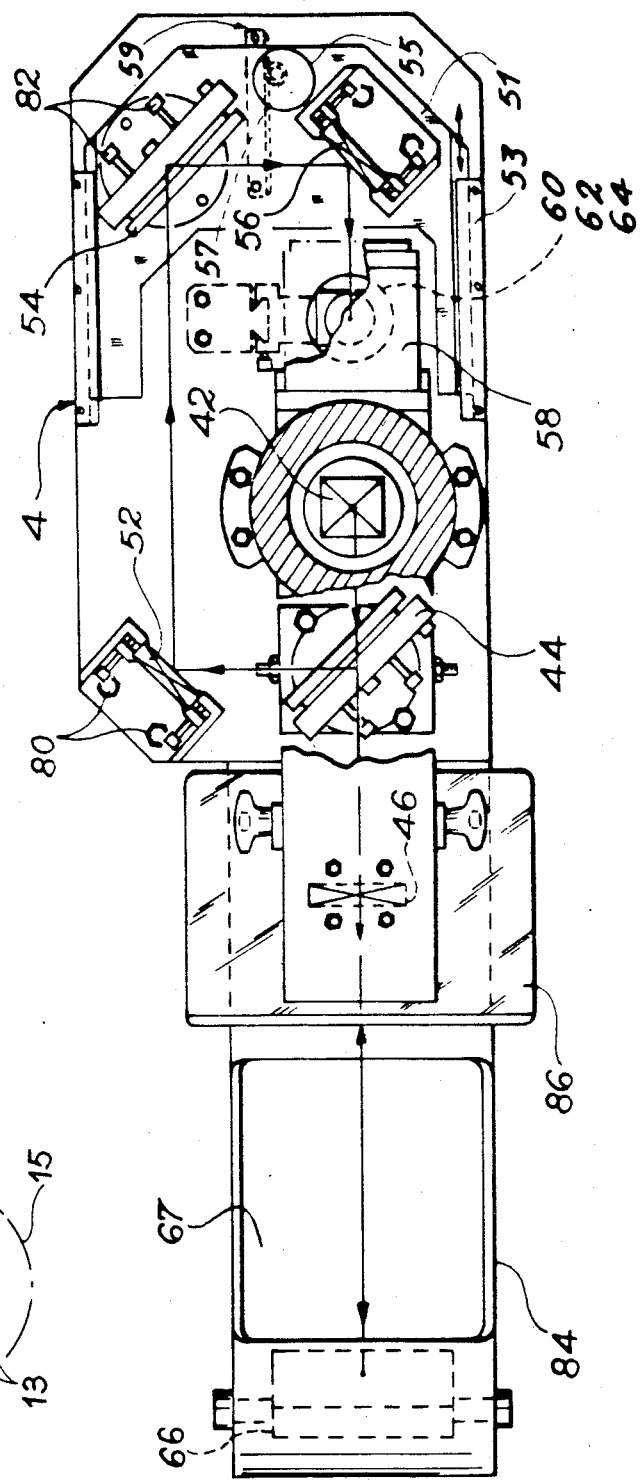
Figure 8:
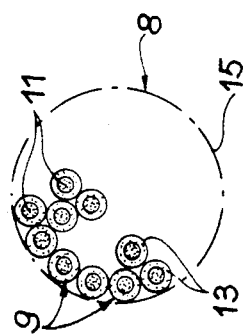
Figure 5:
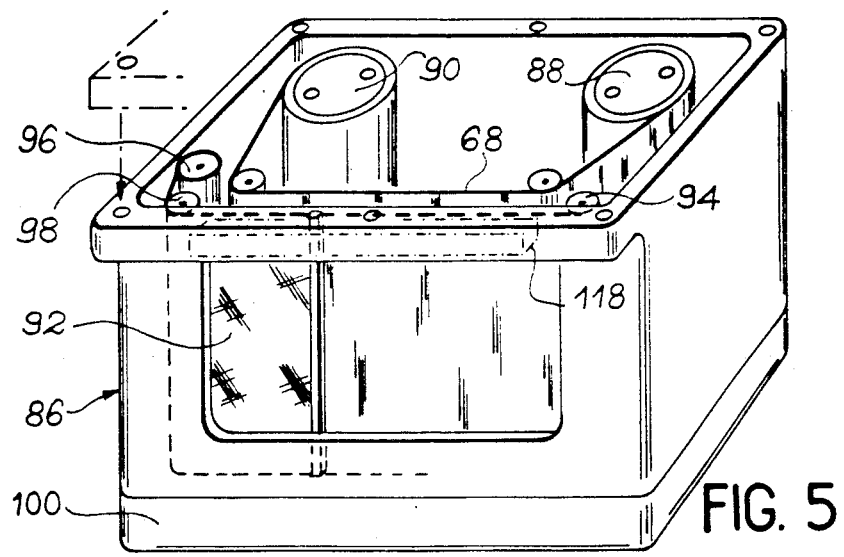

The invention will be more easily understood from reading the description which follows, given simply by way of illustration which is by no means restrictive and accompanied by the annexed drawings in which:

FIG. 1 is a diagrammatic perspective view of the whole of the device according to the invention and showing the laser source and the camera connected to a bundle of optical fibers, FIG. 2 is a perspective diagrammatic view illustrating the tracking of the laser beam from the source as far as the camera and the object to be inspected, FIG. 3 is a diagrammatic front and cutaway view of a camera which can be used in the invention and connected to a laser source by a bundle of optical fibers, FIG. 4 is a topview of this same camera according to the arrow F of FIG. 3, FIG. 5 is a perspective view of the recorder box of the said camera, FIGS. 6a to 6h are diagrammatic views illustrating the various stages for taking an interferogram, FIG. 7 is a diagrammatic front view showing how an inspector observes the interferograms and FIG. 8 is a cutaway diagrammatic view of a bundle of optical fibers used in the invention.

If reference is made to FIG. 1, it will be seen that the optical holography inspection device according to the present invention consists of a laser source 2 connected to a holographic camera 4 placed near the part 6 to be inspected by a bundle of sequenced optical fibers 8. This involves a bundle of optical fibers such as those which are also designated in the field in question by the "coherent network of fibers" or by the "soft image guide". This disposition allows for large flexibility in use as the bundle 8 has a first extremity secured to the laser source 2 and its other extremity secured to the camera 4. It is thus possible to move the source 2 and camera 4 in relation to each other without having to carry out any adjustment as the laser beam is transmitted through the cable 8, regardless of the spatial position of the latter. For example, this disposition enables the laser source 2 to ascend a vehicle 10 and for the device to be used, even if the part to be inspected 6 is separated from the laser source 2 due to obstacles, such as the vertical walls 12 which can be avoided by laying the cable 8 on the ground. The cable can also pass by above an obstacle such as the wall 14.

In the case of FIG. 1, the camera 4 is mounted on a support 16 placed on the ground, but another mounting is possible using the invention. For example, the camera may be attached to a support 20 (FIGS. 2 to 4) whilst being mobile in rotation around one axis merging with the axis of the laser beam entering the camera.

By referring to FIG. 2, it can be seen that the laser source 2 is connected to the camera 4, represented in the diagram by broken lines, via the optical fibers' cable 8. This cable is secured to the camera using an assembly to be described later and referred to in FIG. 3. The mounting allows the laser beam 28 to enter the camera 4 by following a route which coincides with the spin axis 24 of the camera in relation to the support 20.

The beam 28, after having penetrated the camera, encounters a prism 42 which throws it back and returns it along an approximately horizontal direction onto a separator 44 which samples one part of the beam which will make up the reference beam 43, whilst another part, directly crossing the separator 44, constitutes the object ray 45. The object ray 45 is conditioned by a set of lenses 46 and eventually strikes the film pack 68 where it interferes with the reference beam.

In the particular case described here, the reference beam leaving the separator 44 firstly encounters three mirrors 52, 54 and 56 which deflect it into a horizontal plane and then the mirror 58 deflects it along a vertical direction: as regards this part of the trajectory, the beam is conditioned by a filter 60 and a lens 62 before being deflected along a horizontal direction by a mirror 64. The beam then strikes a mirror 66 which sends it onto the photo-sensitive film or film pack 68. This disposition allows for maximum camera compactness. The orientation of the mirror 66 and film 68 ensures that the reference beam strikes the latter under an angle identical to that under which it will subsequently be illuminated by a laser beam when an inspector shall carry out observations.

The constitution of the camera can be more easily understood by considering FIGS. 3 and 4 where it can be seen that it is equipped with a bearing 70 (FIG. 3) mounted on the bracket 20 using ball bearings 72. The bearing 70 includes an annular gear 74 which cooperates with a pinion 76 moved by a motor 78. This disposition allows for rotation of the camera around the axis 24, but other rotational means can be used in the invention, including a manual rotation.

It can also be seen on FIG. 3 that the laser source 2 is connected to the camera 4 by the bundle of optical fibers 8. A lens 3, mounted on the laser source 2, allows the beam to be assembled before it enters the cable 8. The other extremity of the cable is fixed into a holding device mounted onto the support 20. A focussing lens 23, placed close to the lower extremity of the bearing 70, allows the beam at the cable 8 to be made parallel, as it has a tendency to diverge owing to its trajectory inside the cable. Of course, this only concerns one example of embodiment and the device according to the invention allows for other mountings. However, it is essential that the beam leaves the cable 8 before encountering the separator 44 so as to avoid the drawbacks of the prior art which have been described above. And, where the camera is rotary mounted on a support, it is necessary to ensure that the beam entering the camera is merged with the axis of rotation.

FIGS. 3 and 4 also show the separator 44 which samples the reference beam and the mirrors 52 to 66 which reflect it as far as the film pack 68. Each of these mirrors is equipped with screws which enable the position to be adjusted to them, these screws being the screws 80 of the mirror 52 or the screws 82 of the mirror 54. It is possible to vary the length of the reference beam by altering the relative positions of the different mirrors inside the volume of the camera. Thus, if one wishes to vary the camera/object distance, and consequently the length of the object ray, one needs to vary the length of the reference beam proportionally. FIG. 3 shows the camera including at its lower section an arm 84, the mirror 66 being placed at the front extremity of the arm 84. This disposition seeks to send back the beam reflected by the mirror 66 onto the film pack 68 under an angle corresponding to the angle observed by the inspector once the interferograms have occurred, the beam passing through an opening 67 provided in the arm 84. The figure also shows the recorder box 86 which contains the film pack 68, this box being placed above the arm 84 so that the film pack directly receives the beam backscattered by the object.

FIG. 7 shows how an inspector observes the interferograms after development of the film. The inspector 108 is seated, which represents the most natural observation position. A laser source 110 emits a horizontal beam 112 which is sent in a vertical direction by a mirror or prism 119 and strikes the film pack 68. This pack is inclined in relation to vertical so as to facilitate observation and the beam 112 strikes this pack 68 under an angle $\phi$ equal to that under which it struck it in the camera (FIG. 3). The observer can easily see in relief the virtual image 116 of the object to be examined. Moreover, this disposition offers another advantage as the laser beam reflected by the mirror passes vertically in front of the face of the inspector without dazzling him.

The value of the angle $\phi$ is between 30° and 50° and preferably between 33° and 39°. These values result from a compromise from amongst several requirements. In effect, the angle $\phi$ must allow for sound efficiency of the sensitive film, i.e. enable sufficiently visible interferences to be obtained. Moreover, it is essential to ensure that the operator is seated comfortably, i.e. that he can move his face to observe the interferogram without being possibly dazzled by the laser beam used for observation. Finally, he is restricted by the mechanical set-up of the camera. The inventors have found that a satisfactory compromise could be obtained by giving the angle $\phi$ a value of between 3020 and 50° and preferably of between 33° and 39°. A camera has been produced whereby, all things being equal, the position of the film pack can be varied within a range of 6°, but, as far as the invention is concerned, it is not essential to modify the value of this range or even to use a system in which the position of the film would be the same in all cases.

As regards the disposition illustrated in FIG. 7, this is merely one example and other assemblies can be used to transmit the laser beam 112, for example a source directly emitting a vertical laser beam. The main point is that the angle under which the beam 112 strikes the film is equal to the angle under which the reference beam strikes the film inside the camera.

The perspective view of FIG. 5 shows the recorder box 86 which traditionally includes a film pack 68 which unwinds between a take-off reel 88 and a take-up reel 90. A shutter 92 fitted with a window can move along a to-and-fro movement in front of the film pack, as shall be explained in detail hereafter by referring to FIGS. 6a to 6h. The shutter 92 is mounted on two reels 94 and 96 and guided by a spindle 98. The lower part of the box also shows an electronic monitoring device 100 which controls the unwinding of the takes. Moreover, a film marking device 118, for example an LED alphanumeric device, enables the takes to be identified.

Figure 6:
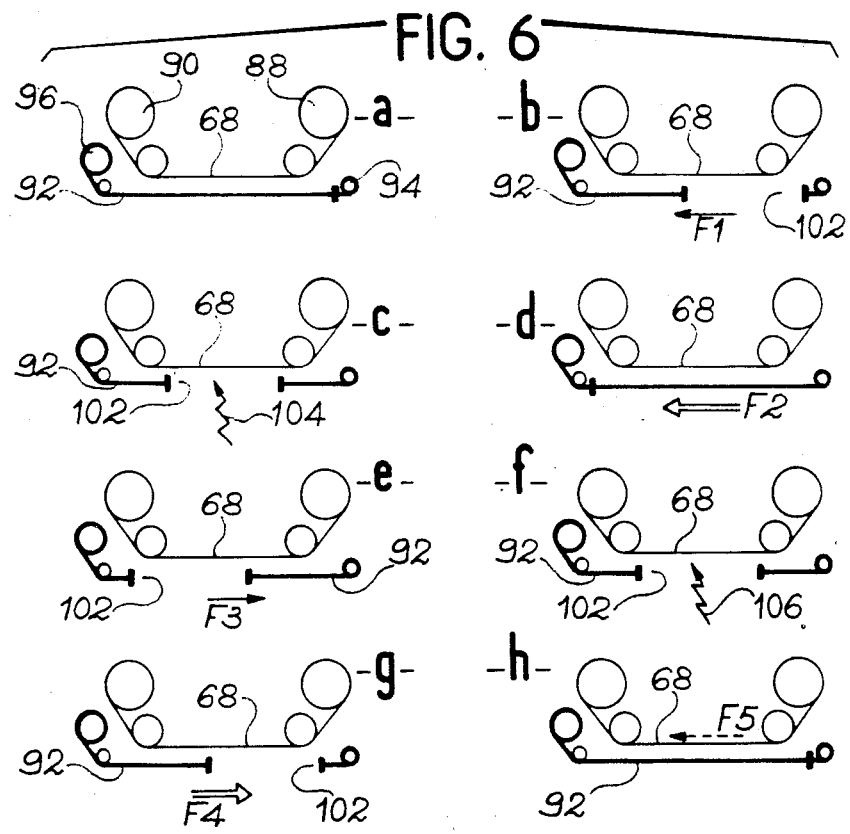

This automatic cycle is illustrated by FIGS. 6a to 6h. FIG. 6a shows the start position in which the shutter 92 is placed in front of the film 68 and prevents a parasite light beam from exposing the film. When the box receives, for example from a programmable automaton piloting all of the device, the order for carrying out the first exposure used to produce an interferogram, the box gives itself the order to open the shutter which moves in the direction of the arrow F1 (FIG. 6b), i.e. from right to left when viewing the figure. This aims to bring the opening or window 102 provided inside the shutter in front of the film 68. One thus arrives at the position of FIG. 6c in which the opening 102 is completely in front of the film 68. At this moment, the box sends the order for triggering the laser beam and the film is exposed by the reference beam and object ray, as shown diagramatically by the broken arrow 104. The box then gives itself the order to close the shutter which moves in the direction of the arrow F2 of FIG. 6d, i.e. still from right to left according to the drawing. If the first shot has been taken whilst the object to be inspected was not under stress, the box sends the order to stress the object by means of a suitable device.

When the object is stressed, the box receives the order to carry out a second exposure and gives itself the order to open the shutter. This shutter then moves in the direction of the arrow F3 (FIG. 6e), i.e. from left to right. This aims to bring back the opening 102 in front of the film pack 68 and one arrives at the position of FIG. 6f which is the same as that of FIG. 6c. When the position of FIG. 6f is reached, the box sends the order to untrigger the laser and the film is exposed by the laser light as symbolized by the broken arrow 106 of FIG. 6f. Then the box gives itself the order to close the shutter which moves in the direction of the arrow F4 (FIG. 6g), i.e. from left to right. One thus arrives at the position of FIG. 6h, which is the same as that of FIG. 6a, with the shutter closed. At this moment, the box gives itself the order to advance the film by a shot, as shown by the broken arrow F5 on FIG. 6h; then, if it is desired to monitor it by observing another section of the part to be examined, the box sends an order to move the camera or object, for example by rotating the latter around the vertical axis 24. The camera and object can also be moved simultaneously. The box may still give the order to return the part to a non-stressed state and the cycle is begun again.

The film pack 68 can be a conventional standard film or thermoplastic film. If a thermoplastic film, when used together with a video play-back, as for example with the device 120 shown by the dot-and-dash lines on FIG. 3 for memorizing images, an instant or slightly delayed examination can be carried out without losing the advantages offered by automation, the time elasping between the taking of the shot and the observation of the interferogram being a few seconds. Where a thermoplastic film is used, this is first of all sensitized by depositing electrical charges through the Corona effect (sensitization phase). The film is then exposed to the light, which provokes load mismatchings creating electrostatic forces whose distribution is a transponder reply of the luminous intensity distribution resulting from interferences between the two beams. The development of the hologram consists of heating the output film so that the thermoplast warps under the effect of the electrostatic forces. Fixing is instantaneous as the film hardens upon returning to ambient temperature. The hologram (or interferogram) thus created is produced as a variation in thickness of a transparent material, i.e. is a phase hologram.

The device according to the invention can used according to three modes of operation:
manual mode,
automatic mode and
semi-automatic mode.

In the manual mode, access is gained to all the functions independently of each other by means of push-buttons. This mode is used mainly for making available a phase or monitoring an element of the installation or monitoring non-standard parts. The automatic mode is the normal operating mode. In this case, the operator only intervenes once to trigger the entire automatic cycle. The semi-automatic mode cuts off the automatic mode in successive steps, the operator only intervening in order to jump to the next step. This mode of operation essentially enables the automatic programme to be inspected or part of it to be modified.

Management of the entire unit is effected by a programmable system, which can be a programmable automaton as, for example, the PB 100 automaton sold by the MERLIN-GERIN company. This appears in the form of a metal box containing connectors designed to plug in the sub-assemblies and terminals enabling the automaton to be connected to the various sensors and actuators contained by the device. The plug-in sub-assemblies include a central processing unit which monitors the operation of the automaton and manages the exchanges between the various sub-assemblies, input cards which acquire "all or nothing" information originating from the different sensors, and output cards which send to the actuators the "all or nothing" orders drawn up by the automaton.

All these sub-assemblies are interswitched by a bus serving as a medium for the exchanges of information. This unit is completed by a programming and operator's console which enables the operator to enter into dialogue with the automaton. Connected directly to the central processing unit, this console allows for the introduction of the programme into the memory of the automaton and its checkout. It is also used to verify or modify an existing programme. Once written, the programme can be safeguarded by recording it on a cassette. Naturally, the console is disconnected in normal operation as it is the automaton which manages and controls all the operations.

For this purpose, it is also possible to use devices other than a programmable automaton: for example, a device based on the use of microprocessors would also respond to the desired requirements.

Of course, the invention is not merely restricted to the one mode of embodiment just described above, but the invention also allows for other variants. Consequently and according to the case involved, the expert could also have altered the number and position of the prisms or mirrors used to deflect the reference beam, depending upon the used required. It should be mentioned that the distance between the camera and the surface to be examined must be such that the latter occurs inside the "coherence volume", i.e. inside the space which enables interferences to be obtained on the film pack between the reference beam and the object ray. Many possibilities exist to observe the largest possible surface area of the part, especially if the part is hollow. For example: rotation of the part around a horizontal axis, possibly combined with a rotation of the camera around a vertical axis, or even rotation of the camera around a horizontal axis. It is also possible to add translation displacements of the camera, these being effected manually or automatically. This can result in the need to move and readjust the mirrors or prisms which determine the length of the reference beam, this operation being possibly automated and thus linked to the automaton. Thus, the automaton operates, by remote control, motors connected to each sliding device and supports the mirrors 52 to 66. It is thus possible to obtain the length variation of the reference beam by displacing the mirrors or prisms 52 and 54 or 54 and 56 or even 52, 54 and 56.

FIGS. 3 and 4 illustrate a drive example suitable for simultaneously displacing the mirrors (or prisms) 54 and 56 along the longitudinal direction of the camera. It can be seen that these two mirrors are mounted on a sliding plate 51 which can move longitudinally in relation to the camera and are guided by slides 53. The displacement is obtained using a motor 55 mounted on the plate 51 and which drives a pinion 57 which cooperates with a rack 59 secured to the camera 4. It is also possible to provide a similar system to simultaneously move the mirrors 52 and 54 into the transversal direction of the camera or a more complex system for moving the three mirrors 52, 54 and 56. Of course, this is merely one mode of embodiment and the invention allows for the use of another type of drive to displace the mirrors in relation to the camera.

Thus, the device according to the invention offers considerable advantages, the main one of which is its increased flexibility in use. Indeed, as the camera is separated from the laser source, it is easy to move it so as to control or monitor the various aspects of a given part or even to place it inside a small cavity previously inaccessible to prior devices. Thus it is possible to use a camera as per the one shown on FIGS. 3 and 4 and whose outer dimensions are about 270×520×940 mm and weighs about 37 kg, whilst currently known devices have dimensions which are all larger than 1 meter and weight more than one ton.

Secondly, as the laser beam is transmitted from the source to the camera via a sequenced bundle of optical fibers, this transmision is effected regardless of the spatial disposition of this bundle. It is thus no longer necessary to carry out long and delicate operations, such as the adjustment of the position of the mirrors. The use of a bundle of optical fibers also allows the device to be used in places to which access is relatively difficult or in places where there are obstacles between the laser source and camera, as illustrated by FIG. 1.

Moreover, the use of a beam containing a very large number of sequenced fibers of small diameter enables a high-powered laser beam to be transmitted without deteriorating the fiber bundle or the laser beam.

A certain number of experiments have been made using a bundle of sequenced optical fibers marketed by the BODSON company under reference IG 445-108.

The cutaway view of FIG. 8 shows the composition of such a cable. It shows that the cable 8 consists of a collection of elementary fibers 9, each of which is made up of a core 11 encompassed by cladding 13, all the fibers being encompassed by an outer envelope 15. So as to make the drawing clear, the scales have not been observed on FIG. 8: in fact, the diameter of the fibers is about several microns. The bundle used includes about 100,000 fibers 10 $\mu$m in diameter and consisting of a glass core and a glass cladding having a refraction coefficient lower than the first one.

With such a bundle of fibers, it is possible to verify that the coherence of time of the laser beam is retained and the coherence of space is very quickly reconstituted after the output of the bundle of fibers. In effect, the number of modes which can be disseminated as regards each unit fiber is low: their small diameter and coefficient gradient, which move a small digital opening, make these unit fibers behave almost as if they were "monomode" fibers. The paths covered by the laser beam as regards each of the fibers of the bundle are thus practically equal, which enables the coherence of space to be retained. Moreover, the energy resistance is very high as the energy density of each fiber is very weak owing to the large number of unit fibers.

Moreover, the small digital opening of the bundle of fibers only imposes the use of optics having a reduced diameter which gives the unit compactness.

It has also been shown that interferences can occur, even if the bundle of fibers moves between two takes or possibly even during takes. Indeed, if certain mode skips can occur in certain fibers during movement, the output energy of the bundle is the sum of the energy emitted by each of the fibers (whose number is about 100,000 or more) and this gives rise to an energy front smoothing phenomenon: the fringe contrast is thus very clear.

Moreover, as the bundle of fibers has relatively large dimensions (e.g. effective section of 4 mm×4 mm in the example mentioned above), it is not necessary to focus the laser beam at the optical fiber input cable, but simply to make it converge. Indeed, in previously known devices, owing to the very small section of fibers, it is necessary to focus the laser beam at the input: this provokes a high concentration of energy which can result in an ionization of the air and cause disruptive breakdowns which might destroy the fibers.

Finally, the fact that an optical fiber cable is used solely upstream of the separator along the propagation direction of the laser beam enables all the drawbacks presented by previous devices, and listed at the start of this description, to be eliminated. The separation of the reference beam and object ray after transporting the laser beam allows for two highly similar wave fronts to be disposed between them and improves interference. By way of a test, holograms and interferograms have been produced which cover surface areas of 1 m×1 m for an initial laser energy of 280 millijoules conferring an energy of 120 millijoules at the fiber bundle output.

Of course the invention is not restricted to the modes of embodiment just described, but allows for other variants. The device according to the invention may be used, regardless of whichever laser source or camera is used. Therefore it is possible to use pulsed laser sources, such as ruby lasers, YAG lasers or copper vapor lasers. As for the bundle of fibers, the materials making up the core of fibers or cladding are adapted according to the absorption spectrum of the latter and the laser used. However, it should be noted that the diameter of the core of the elementary fibers must be as small as possible with the refraction coefficients adapted for them to be as close as possible to "monomode" operation. As for the ratio between the core diameter and cladding thickness, this must be as large as possible so as to optimize the space factor of the bundle with the cores of the fibers. Whilst remaining very large, the number of elementary fibers can be modified according to the energy transmitted.

As for the length of the bundle, this can be of any length whatsoever depending upon the environment of the part to be inspected and the presence or absence of obstacles close to it, but, in any event, this length remains linked to the acceptable attenuation within the said bundle and to the power or output of the transmitter used. As for its section, this can be of any shape (circular, rectangular, square, etc).

There are numerous applications of the invention and these concern all fixed or mobile holography devices. For example, it is possible to instal the laser source and camera on a vehicle (FIG. 1) which enables the entire device to be moved to the various positions where the holograms are to be made, the laser source remaining on the vehicle and the camera being placed at the various locations to be observed. The device according to the invention can be applied for any interferometry non-destructive inspection, as for example holography methods or the Speckle, Mach-Zender, Shadow, Michelson methods, etc., or even in cinemo-holography (three-dimensional cinema technique) and cineinterferometry (holography interferometry time process characterization or control technique).

What is claimed is:

1. Device for the non-destructive inspection of a part (6) by means of optical holography comprising:
   a source (2) emitting a laser beam;
   a holographic camera (4) placed at a particular distance from the said source (2), this camera (4) including at least:
   an input for the laser beam (28),
   means (44) for creating a reference beam (43) and an object ray (45) by separation of the laser beam and
   means for creating a hologram from the reference beam (43) and object ray (45) and
   means for carrying the laser beam of the source (2) as far as the said input,
   wherein the said carrying means include a bundle of sequenced optical fibers (8) each fiber having a core, said bundle being suitable for transmitting a high power laser beam with monomode propagation through the core of each fiber, whilst maintaining the coherence of time and space of this laser beam.

* * * * *